Patented Dec. 7, 1937

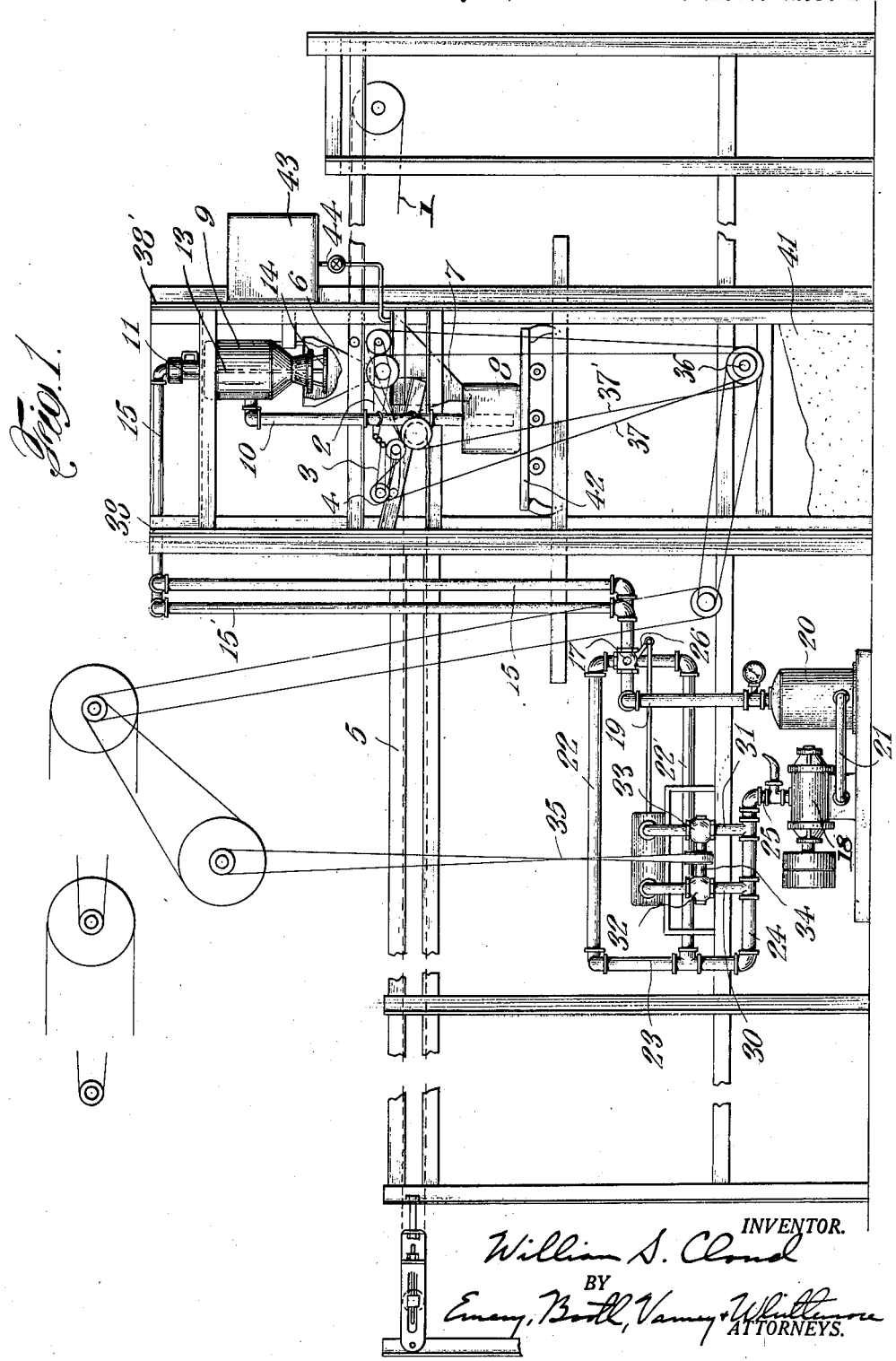

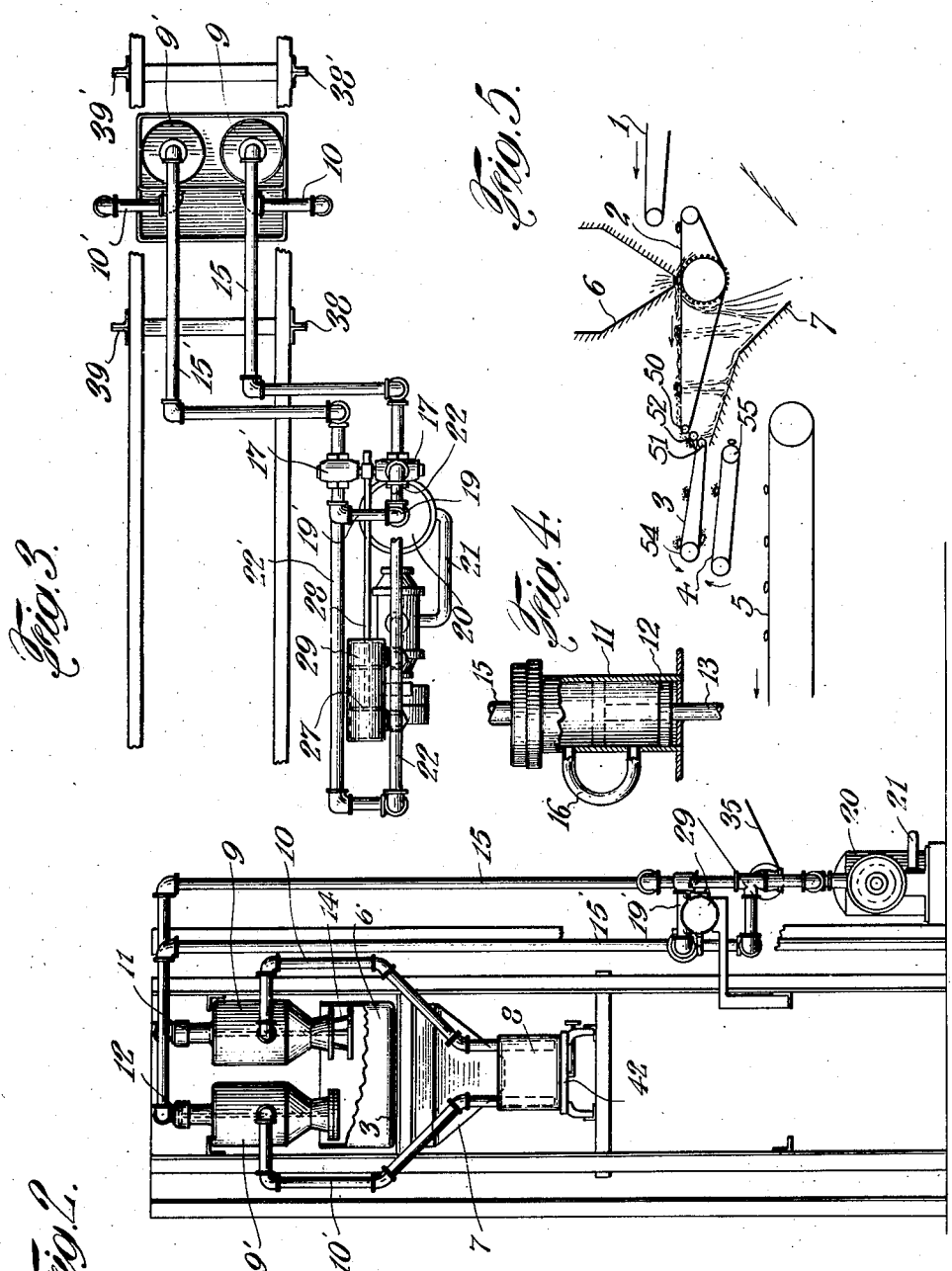

2,101,240

UNITED STATES PATENT OFFICE 2,101,240

METHOD AND APPARATUS FOR COATING CONFECTIONS

William S. Cloud, Wilmette, Ill.

Application May 25, 1933, Serial No. 672,775

5 Claims. (Cl. 91—3)

This invention relates to candy manufacture, and pertains more particularly to methods and apparatus for covering nuts or other confection centers with a candy coating of the glaze type.

Machines for coating nuts and other centers with chocolate and similar coatings have been in use in the candy industry for a very long time, but up to the present time all glazed candies have been made by hand dipping processes, due to the tendency of the glazing syrup to crystallize or grain when handled in ordinary enrobing machines. It is an object of the present invention to handle the syrup in such manner that crystallization may be avoided. It is a further object of the invention to so handle the pieces after the coating is completed that a uniform evenly distributed coating will result.

Other objects and advantages of the invention will appear hereinafter.

A preferred embodiment of the invention selected for purposes of illustration is shown in the accompanying drawings, in which, Figure 1 is a front elevation of the machine.

Figure 2 is an end elevation.

Figure 3 is a top plan view.

Figure 4 is a detailed sectional view.

Figure 5 is a semi-diagrammatic view of the conveying system.

Referring to the drawings, the apparatus comprises a system of conveyors for handling the confections during their progress through the machine, the said system comprising a feeding conveyor 1 on which the nuts or other centers to be coated are fed, a coating conveyor 2, handling conveyors 3 and 4, and a delivery conveyor 5. All of the said conveyors are mounted on a suitable framework of structural metal, being supported thereon in any convenient manner. The said conveyors are driven in any suitable manner, as by the system of belts and pulleys indicated in Figure 1, all of which may be driven from a suitable source of power. The said belts and pulleys are so arranged that the coating conveyor 2, the handling conveyors 3 and 4 and the delivery conveyor 5 are all driven at the same lineal speed, for purposes which will be explained hereinafter, but the feeding conveyor may be operated at either the same speed or at a greater or less speed than the other conveyors depending upon the spacing of the pieces which is desired.

The coating conveyor 2 and the handling conveyors 3 and 4 are preferably made of wire mesh of the kind customarily used in enrobing machines, in order to permit the excess coating syrup to drip through the conveyors. The delivery conveyor 5 is preferably a metal conveyor (sheet metal or metal plates), due to the fact that metal rapidly absorbs heat from the coated pieces, and also because the pieces may be readily removed therefrom.

Mounted directly above the coating conveyor is a device for distributing coating syrup over the centers travelling on the coating conveyor, the said device comprising a funnel-shaped member 6 having a transverse slot in the bottom thereof extending across the entire width of the coating conveyor and adapted to distribute a curtain of coating syrup over the centers thereon.

Located beneath the coating conveyor is a receiving device for collecting the excess syrup which drips from the conveyors, the said device comprising the funnel-shaped member 7 having an opening at the bottom to discharge the collected syrup into the tank or reservoir 8.

Means are provided for elevating the syrup from the reservoir 8 to a point above the distributor 6 in order to replenish the distributor and to provide a continuous flow of syrup from the distributor over the coating conveyor. It has been found to be desirable to avoid moving parts in elevating the syrup in order to avoid crystallization, and accordingly means have been provided for applying a differential of air pressure to the syrup. For this purpose two tanks 9 and 9' are mounted above the distributor 6 and the said tanks are connected respectively by means of conduits 10, 10' to the reservoir 8. Inasmuch as these tanks 9 are duplicates in construction and operation, only one will be described in detail.

At the upper end of the tank 9 is arranged a cylinder 11 in which is mounted a piston 12 connected by rod 13 to a valve 14 adapted to open and close the bottom of the tank 9 so as to control the egress of syrup therefrom. Connected to the upper end of the cylinder 11 is a pipe 15 connected to an air compressor, as hereinafter described, in such manner that subatmospheric or superatmospheric pressure may be applied selectively thereto. When subatmospheric pressure is applied, the piston 12 is caused to rise, thus closing the valve 14 and sealing the opening at the bottom of the tank 9. At the same time subatmospheric pressure is communicated to the tank 9 through by-pass 16 and as soon as the valve 14 is closed, the pressure in the tank 9 is reduced, and syrup is drawn up through the conduit 10 and discharged into the tank 9. This continues, until as hereinafter described, superatmospheric pressure is applied to the cylinder 11, at which time the piston 12 is caused to move downwardly, thus opening the valve 14, permitting the accumulated contents of the tank to be discharged into the distributor 6. The piston 12 is preferably loosely fitted in the cylinder 11 in order to permit superatmospheric pressure to be communicated to the tank 9 in order to assist in discharging the contents. In the foregoing description where the use of superatmospheric pressure has been referred to, it will be understood that the valve 14 could also be opened by admitting air at atmospheric pressure through pipe 15, but superatmospheric pressure is preferred because it acts more rapidly, and because it may be used, as previously explained, to assist in discharging the contents of the tank.

In the preferred embodiment illustrated in which two tanks 9 and 9' are provided, the said tanks are operated alternately by means hereinafter described, in such manner that one tank is being filled while the other is being discharged, and vice versa, whereby a substantially continuous flow of syrup is provided to the distributor 6.

For this purpose the pipes 15, 15' are each connected to a separate three way valve 17, 17', and each valve is provided with connections to both the pressure side and the suction side of the compressor. Thus, the valve 17 is connected to the suction side of the compressor 18 by pipe 19, condenser 20 and pipe 21, while the valve 17' is connected thereto by pipe 19', condenser 20 and pipe 21. The valve 17 is also connected to the pressure side of the compressor 18 by pipes 22, 23, 24 and 25, while valve 17' is connected thereto by pipes 22', 23, 24 and 25.

Valves 17 and 17' are provided with a common operating lever 26 and are so arranged that when valve 17 is set to connect pipe 15 to the suction side of the compressor, the valve 17' will be set to connect pipe 15' to the pressure side of the compressor and vice versa.

The lever 26 may be operated by hand if desired, but it is preferably operated automatically as by means of piston 27 connected to the lever 26 by rod 28. The piston 27 is mounted in cylinder 29, the ends of which are connected to pipe 25 by pipes 30 and 31. Interposed in the pipes 30 and 31 are valves 32 and 33, respectively, having a common operating shaft 34 which may be rotated slowly in any suitable manner as by belt 35 connected to the main drive mechanism through any suitable speed reducing mechanism. The valves 32 and 33 are so adjusted as to alternately connect the ends of cylinder 29 with the pressure maintained in pipe 24 in order to reciprocate the piston 27 to cause it to operate lever 26. The operation of this mechanism is so timed as to permit the tanks 9 and 9' to be substantially refilled during each cycle of operation, and to keep the distributor 6 filled at all times so as to provide a constant flow of syrup over the centers on the conveyor 2.

After the centers have been coated they move with the conveyor 2 in the direction indicated in Figure 5 and are discharged from the conveyor 2 to the conveyor 3. The roller 50 at the delivery end of the conveyor 2 is preferably of small diameter (preferably about ⅜"), as is also the roller 51 at the receiving end of conveyor 3, and between these two rollers is located a third roller 52 which helps to transfer the coated pieces from conveyor 2 to conveyor 3 and also serves to spread the coating of syrup over the entire bottom surface of the centers. As illustrated in Figure 5 the rollers 50, 51 and 52 are arranged in an inclined plane along which the coated pieces move without any tendency to lodge or stick in the interstices between the rollers. If desired, the roller 52 may be driven at a peripheral speed approximately equal to the lineal speed of the conveyors.

The handling conveyors 3 and 4 are intended to manipulate the coated pieces in such manner as to cause the coating to be evenly distributed thereon. After the pieces are received on conveyor 3 they are carried in the direction indicated by the arrows, and are carried around the roller 54 (of somewhat larger diameter than roller 51, and preferably about 1" in diameter) and they cling to the under stretch of conveyor 3 until, as the coating peels away from the conveyor, they fall by gravity to the upper stretch of conveyor 4. As previously explained, the upper stretch of conveyor 4 is moving in the same direction and at the same speed as the lower stretch of conveyor 3. Consequently, irrespective of the place where the pieces drop from one conveyor to the next, the pieces will be spaced in exactly the same relationship which they occupied on the conveyor 3.

The conveyor 3 is long enough and moves slowly enough to permit all of the pieces to drop off before they reach the roller 51.

The above described operation is repeated with respect to the conveyors 4 and 5, for after the pieces are deposited on the conveyor 4, they cling to the conveyor as it passes around roller 55 (also approximately 1" in diameter), but are permitted to fall by gravity from the lower stretch of conveyor 4 to the upper stretch of delivery conveyor 5, the pieces again being regularly spaced due to the fact that the lower stretch of conveyor 4 travels in the same direction and at the same speed as the upper stretch of conveyor 5.

It will be noted, however, that the pieces have been inverted twice during their progress, being upside down on conveyor 4, and being restored to normal position on conveyor 5. This inversion improves the distribution of the coating, and provides a coating of even thickness on all sides of the piece.

The conveyors 2, 3, 4 and 5 may be driven in any suitable manner, one such arrangement being illustrated diagrammatically in Figure 1, in which the countershaft 36, which is driven in any suitable manner, is connected by means of chains or belts 37, 37' with sprockets or pulleys fixed on the conveyor shafts. The diagrammatic arrangement illustrated in the drawings may be varied as desired as long as the lineal speed of the respective conveyors remains substantially the same.

The entire space which is enclosed within the supports 38, 38', 39 and 39' is carefully insulated by slabs of insulating material 41 and is maintained at a temperature of approximately 275 degrees F. in order to keep the syrup at proper coating consistency during the coating operation. As illustrated in the drawings, heat is supplied by a gas burner 42, but it may be supplied in any convenient manner, as by steam or electricity, for example.

The syrup which is used for the coating operation may be cooked to the proper consistency before being placed in the machine, and additional quantities of cooked syrup may be added from time to time to replace that used in the coating operation.

An alternative method of operation may be followed, if desired, however, which takes advantage of the fact that the syrup is subjected to subatmospheric pressure as it is used. Syrups used for glazing purposes are cutomarily cooked under atmospheric pressure at a temperature in excess of 300° F. At this temperature there is a tendency toward inversion of the sugar in the syrup,—that is, a tendency for the original sucrose to be converted to dextrose and levulose,—and the longer the cooking is continued, the greater the degree of inversion. Inversion is to be avoided, because the presence of dextrose and levulose renders the candy hygroscopic and sticky in damp weather.

It is well known, of course, that cooking temperatures may be reduced by reducing the pressure below atmospheric and that the greater the reduction in pressure, the lower the temperature required. Thus, if the material is subjected to a vacuum of 10 inches, a temperature of 275° F. is adequate for cooking purposes. If a lower vacuum of say 6 inches is applied, a higher temperature will be necessary, but if a higher vacuum of about 20 inches is applied, a lower temperature is sufficient.

I have discovered that by introducing raw or partially cooked syrup into the machine at a point below the coating conveyor where it is thoroughly mixed with a quantity of cooked syrup, and then submitting the mixture to a vacuum necessary to elevate it preparatory to being used for coating purposes, the syrup can be adequately cooked for coating purposes. For this purpose, a reservoir tank 43 may be provided having a conduit 44 which discharges into the funnel 7 below the coating conveyor. This reservoir tank 43 may be filled with raw or partially cooked syrup which may be permitted to flow through the conduit 44 at a rate approximately equal to the rate at which syrup is consumed in the machine. This raw or partially cooked syrup is thoroughly mixed with the cooked syrup as it flows into the tank 8, and the raw syrup is cooked during its progress through the machine. The vacuum which is applied to elevate the syrup (approximately 10") is sufficient to cause the syrup to boil vigorously during the time the syrup is maintained under vacuum, and the water vapor which is evolved is removed in the condenser 20. If desired, a higher vacuum may be applied in order to increase the rate of evaporation, but if this is done, the conduits 10 and 10' should be constricted by valves in order to prevent the syrup from flowing too rapidly.

It will be understood that the invention may be variously modified and embodied within the scope of the subjoined claims.

I claim as my invention:

1. In a confection coating machine, in combination, a conveyor for receiving freshly coated confections which have been coated with a thick, viscous syrup, a second conveyor located beneath said first conveyor, and a third conveyor located beneath said second conveyor, the upper stretches of said second and third conveyors moving in the same directions and at the same speed as the lower stretches of the first and second conveyors respectively, said confections being permitted to drop by gravity from the lower stretch of the first conveyor to the upper stretch of the second conveyor and then from the lower stretch of the second conveyor to the upper stretch of the third conveyor, whereby, in order to effect an even, uniform coating said confections are turned upside down on said second conveyor and restored to normal position on said third conveyor, the relative spacing between said confections being maintained at all times.

2. In a confection coating machine, in combination, a system of conveyors for manipulating freshly coated confections which have been coated with a thick, viscous syrup, comprising an odd number of substantially horizontal conveyors arranged one below another, all of said conveyors moving at the same speed, and with opposed stretches of adjacent conveyors moving in the same direction, said confections being permitted to drop by gravity from the lower stretch of one conveyor to the upper stretch of the conveyor below, the confections being inverted by each transfer in order to effect an even, uniform coating, but maintaining their relative spacing at all times.

3. The method of handling syrup to be used for coating confections which comprises circulating the syrup in an endless path, causing it to pass over the confections to be coated during a portion of said path, maintaining the syrup at a temperature below the boiling point thereof at atmospheric pressure, subjecting said syrup to reduced pressure sufficient to cause it to boil during a portion of its travel in said endless path utilizing the difference between said reduced pressure and atmospheric pressure to accomplish said circulation, and adding fresh uncooked syrup at approximately the rate syrup is consumed in the coating operation.

4. The method of handling syrup to be used for coating confections which comprises circulating the syrup in an endless path, causing it to pass over the confections to be coated during a portion of said path, maintaining the syrup at a temperature below the boiling point thereof at atmospheric pressure, subjecting said syrup to reduced pressure sufficient to cause it to boil during a portion of its travel in said endless path utilizing the difference between said reduced pressure and atmospheric pressure to accomplish said circulation, and adding fresh uncooked syrup at a point in said endless path between where said confections are coated and where said reduced pressure is applied.

5. In the manufacture of coated confections, the method of handling glazing syrups which tend to crystallize when agitated which comprises circulating the syrup in an endless path, applying reduced pressure to said syrup during a portion of its travel and utilizing the difference between said reduced pressure and atmospheric pressure to accomplish said circulation, and causing said syrup to pass over the confections to be coated during a portion of its travel when said reduced pressure is not applied.

WILLIAM S. CLOUD.